(12) United States Patent
Höglund et al.

(10) Patent No.: US 11,240,756 B2
(45) Date of Patent: Feb. 1, 2022

(54) METHODS AND APPARATUSES FOR TRANSMITTING A POWER SAVING SIGNAL

(71) Applicant: Telefonaktiebolaget LM Ericsson (publ), Stockholm (SE)

(72) Inventors: Andreas Höglund, Solna (SE); Magnus Åström, Lund (SE); Yutao Sui, Solna (SE); Anders Wallén, Ystad (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 41 days.

(21) Appl. No.: 16/642,940

(22) PCT Filed: Sep. 17, 2018

(86) PCT No.: PCT/EP2018/075098
§ 371 (c)(1),
(2) Date: Feb. 28, 2020

(87) PCT Pub. No.: WO2019/063336
PCT Pub. Date: Apr. 4, 2019

(65) Prior Publication Data
US 2020/0196242 A1    Jun. 18, 2020

Related U.S. Application Data

(60) Provisional application No. 62/564,729, filed on Sep. 28, 2017.

(51) Int. Cl.
*H04W 52/02* (2009.01)
*H04W 76/28* (2018.01)
(Continued)

(52) U.S. Cl.
CPC ........ *H04W 52/0229* (2013.01); *H04W 8/08* (2013.01); *H04W 28/0268* (2013.01); *H04W 72/042* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2009/0257368 A1* | 10/2009 | Aad | H04W 52/0235 370/311 |
| 2014/0349646 A1* | 11/2014 | Su | H04W 76/28 455/436 |
| 2020/0029302 A1* | 1/2020 | Cox | H04W 56/0015 |

OTHER PUBLICATIONS

Qualcomm, Efficient Monitoring of DL control channel (Year: 2017).*

(Continued)

*Primary Examiner* — Ayanah S George
(74) *Attorney, Agent, or Firm* — Coats & Bennett, PLLC

(57) ABSTRACT

A technique for transmitting and receiving data from a node of a radio access network, RAN, to a radio device is described. The radio device is configured for discontinuous reception, DRX, according to a DRX configuration. As to a method aspect of the technique, it is determined whether data is available for transmission to the radio device. A power saving signal is selectively transmitted to the radio device depending on the DRX configuration. If the data is available, at least one of the data and a scheduling assignment for the transmission of the data is transmitted to the radio device on a radio resource according to the DRX configuration.

19 Claims, 6 Drawing Sheets

(51) Int. Cl.
*H04W 8/08* (2009.01)
*H04W 28/02* (2009.01)
*H04W 72/04* (2009.01)

(56) References Cited

OTHER PUBLICATIONS

Qualcomm Incorporated, "Efficient Monitoring of DL Control Channels", 3GPP TSG RAN WG1 Meeting #90, Prague, Czechia, Aug. 21, 2017, pp. 1-10, R1-1712800, 3GPP.

Huawei et al., "PowerSaving Signal or Channel in NB-IoT", 3GPP TSG-RAN WG2 Meeting #99, Berlin, Germany, Aug. 21, 2017, pp. 1-4, R2-1708301, 3GPP.

Ericsson, "NB-IoT Power Consumption Reduction for Paging and Connected-Mode DRX", 3GPP TSG-RAN WG2 ¥99, Berlin, Germany, Aug. 21, 2017, pp. 1-8, R2-1708284, 3GPP.

Nokia et al., "Signalling for Efficient Decoding of Physical Channels", 3GPP TSG RAN WG1 Meeting #90, Prague, Czech Republic, Aug. 21, 2017, pp. 1-10, R1-1713789, 3GPP.

Ericsson, "Power Consumption Reduction for Paging and Connected-Mode DRX for NB-IoT", 3GPP TSG-RAN WG1 #89, Hangzhou, China, May 15, 2017, pp. 1-5, R1-1706887, 3GPP.

Ericsson, "Wake-Up Signal for NB-IoT & eMTC", 3GPP TSG-RAN WG2 #99bis, Prague, Czech Republic, Oct. 9, 2017, pp. 1-8, R2-1710749, 3GPP.

3rd Generation Partnership Project, "3rd Generation Partnership Project; Technical Specification Group Radio Access Network; Evolved Universal Terrestrial Radio Access (E-UTRA); User Equipment (UE) Procedures in Idle Mode (Release 14)", Technical Specification, 3GPP TS 36.304 V14.3.0, Jun. 1, 2017, pp. 1-49, 3GPP.

3rd Generation Partnership Project, "3rd Generation Partnership Project; Technical Specification Group Radio Access Network; Evolved Universal Terrestrial Radio Access (E-UTRA); User Equipment (UE) Procedures in Idle Mode (Release 13)", Technical Specification, 3GPP TS 36.304 V13.3.0, Sep. 1, 2016, pp. 1-46, 3GPP.

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 14)", Technical Specification, 3GPP TS 36.413 V14.3.0, Jun. 1, 2017, pp. 1-347, 3GPP.

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 13)", Technical Specification, 3GPP TS 36.413 V13.6.0, Jun. 1, 2017, pp. 1-334, 3GPP.

\* cited by examiner

METHODS AND APPARATUSES FOR TRANSMITTING A POWER SAVING SIGNAL

TECHNICAL FIELD

The present disclosure generally relates to a technique for discontinuous reception. More specifically, and without limitation, methods and devices are provided for transmitting and receiving data in a radio communication using discontinuous reception.

BACKGROUND

The evolution of radio communication techniques, e.g. in the framework of the 3rd Generation Partnership (3GPP) for a New Radio (NR) technique, covers Machine-to-Machine (M2M) and Internet of Things (IoT) related use cases. Most recent work for 3GPP Releases 13 and 14 include enhancements to support Machine-Type Communication (MTC) devices with specific device categories, namely Cat-M1 and Cat-M2, supporting a reduced bandwidth of 6 physical resource blocks (PRBs) and up to 24 PRBs for Cat-M2, as well as enhancements to support Narrowband IoT (NB-IoT) devices using a specific radio interface with specific device categories, namely Cat-NB1 and Cat-NB2.

Such enhancements may be regarded as enhancements to LTE. Herein, the enhancements introduced in 3GPP Releases 13, 14 and 15 for MTC are collectively referred to as enhanced MTC or eMTC, including (without limitation thereto) the support for bandwidth-limited devices such as Cat-M1 and the support for coverage enhancements. Moreover, the term eMTC may be used to distinguish M2M uses cases from other NB-IoT uses cases, which term is here used for any 3GPP Release, although the features supported by eMTC and NB-IoT are similar on a general level.

There are multiple differences between LTE and the procedures and channels defined for eMTC and for NB-IoT. Some important differences include specific physical channels, such as the physical downlink control channels referred to as MPDCCH for eMTC devices and NPDCCH for NB-IoT devices, as well as a specific physical random access channel referred to as NPRACH for NB-IoT devices.

Furthermore, a common work item objective for 3GPP Release 15 in the approved work items for both NB-IoT and eMTC aims to further reduce latency and power consumption. Particularly, the power consumption for physical channels in idle mode paging and connected mode discontinuous reception (DRX) is to be reduced for NB-IoT. Similarly, power consumption for physical channels is to be reduced for eMTC. Hence, the enhancements include for both NB-IoT and eMTC that a physical signal indicating whether the radio device needs to decode subsequent physical channels is introduced, at least for idle mode paging. Candidates for such a signal include those discussed in the document 3GPP R1-1706887 for 3GPP TSG-RAN WG1 #89.

However, the proposed signaling does not lead to a reduction in power consumption at the radio device as intended, but instead increases it when the traffic is such that the majority of the paging occasions (PO) of the idle mode are in fact used for paging. The radio device must first decode the physical signal, as an additional step before decoding the NPDCCH or the MPDCCH and then the associated paging message on a physical downlink shared channel. Alternatively or in addition, the network overhead may be deemed too high to afford broadcasting the physical signal, or properties related to the radio device and its radio link may change, which results in an inefficient transmission of the physical signal to the radio device.

SUMMARY

Accordingly, there is a need for a more efficient discontinuous reception technique. Alternatively or more specifically, there is a need for a radio communication technique that allows applying discontinuous reception more efficiently.

As to one aspect, a method of transmitting data from a node of a radio access network (RAN) to a radio device that is configured for discontinuous reception (DRX) according to a DRX configuration is provided. The method comprises or triggers a step of determining whether data is available for transmission to the radio device. The method further comprises or triggers a step of selectively transmitting a power saving signal to the radio device depending on the DRX configuration. The method further comprises or triggers a step of transmitting, if the data is available, to the radio device on a radio resource according to the DRX configuration at least one of the data and a scheduling assignment for the transmission of the data.

At least in some embodiments, by conditioning the transmission of the power saving signal on the DRX configuration, e.g., a signal configuration, the usage of the power saving signal can be controlled, e.g., by the node or the RAN. In same or further embodiments, the power saving signal can be applied more flexibly, e.g., depending on the load at the node, the radio condition between the node and the radio device and/or the capabilities of the radio device.

The data may comprise user data or control data. At least in some embodiments, the power saving signal is a physical signal that can be efficiently decoded and/or detected prior to decoding the scheduling assignment (e.g., on a control channel) and/or the data (e.g., on an NPDCCH or an NPDSCH). Alternatively or in addition, the power saving signal may be implemented using a specific channel. The channel may be defined in terms of time and/or frequency resources.

The term radio device may encompass an eMTC device, an NB-IoT device and a broadband device. In the context of a technique specified by 3GPP, the radio device may be referred to as user equipment (UE).

At least in some embodiments, the method may be implemented as a technique for exchanging data in a radio communication involving discontinuous reception. Particularly, the method may be implemented for controlling, by the RAN, a receiver of the radio communication.

The one aspect of the technique may be implemented at the RAN, e.g., at the node.

As to another aspect, a method of receiving data from a node of a radio access network (RAN) at a radio device that is configured for discontinuous reception (DRX) according to a DRX configuration is provided. The method comprises or triggers a step of selectively enabling, depending on the DRX configuration, a receiver for receiving a power saving signal from the node. The method further comprises or triggers a step of determining, based on the receiver enabled for receiving the power saving signal, whether data is available for reception from the node. The method comprises or triggers a step of receiving, if the data is available, from the node on a radio resource according to the DRX configuration at least one of the data and a scheduling assignment for the transmission of the data.

The other aspect of the technique may be implemented at the radio device.

The technique according to the other aspect may comprise any feature or any step disclosed in the context of the one aspect, or a feature or a step corresponding to the one aspect.

In any aspect, the node may be a base station or a cell of the RAN. The node may encompass any station that is configured to provide radio access to the radio device. The technique may be implemented at the node in relation to a plurality of instances of the radio device. For example, multiple radio devices may camp on the cell or may be in a connected DRX mode with the node.

The radio device may be configured for peer-to-peer communication (e.g., on a sidelink) and/or for accessing the RAN (e.g. an UL and/or downlink, DL). The radio device may be a user equipment (UE, e.g., a 3GPP UE), a mobile or portable station (STA, e.g. a Wi-Fi STA), a device for the Internet of Things (IoT), particularly narrowband IoT (NB-IoT), machine-type communication (MTC), enhanced MTC (eMTC) or a combination thereof. Examples for the UE and the mobile station include a mobile phone and a tablet computer. Examples for the portable station include a laptop computer and a television set. Examples for the MTC and eMTC device include robots, sensors and/or actuators, e.g., in manufacturing and automotive communication. Examples for the NB-IoT device include sensors for security systems and in home automation. The radio device may be implemented in household appliances and consumer electronics. Examples for the combination include a self-driving vehicle, a door intercommunication system and an automated teller machine.

Examples for the node may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

Each aspect of the technique may be implemented on a Physical Layer (PHY), a Medium Access Control (MAC) layer, a Radio Link Control (RLC) layer and/or a Radio Resource Control (RRC) layer of a protocol stack defining a radio communication between the node and the radio device.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN, via the Internet, through the node and/or through the radio device. Alternatively or in addition, any of the method aspects may be encoded in a Field-Programmable Gate Array (FPGA) and/or an Application-Specific Integrated Circuit (ASIC), or the functionality may be provided for download by means of a hardware description language.

As to one device aspect, a device for transmitting data from a node of a radio access network (RAN) to a radio device that is configured for discontinuous reception (DRX) according to a DRX configuration is provided. The device is configured to perform the one method aspect. Alternatively or in addition, the device may comprise a determining unit configured to determine whether data is available for transmission to the radio device. The device may further comprise a transmitting unit configured to selectively transmit a power saving signal to the radio device depending on the DRX configuration. The transmitting unit is further configured to transmit, if the data is available, to the radio device on a radio resource according to the DRX configuration at least one of the data and a scheduling assignment for the transmission of the data.

As to another device aspect, a device for receiving data from a node of a radio access network (RAN) at a radio device that is configured for discontinuous reception (DRX) according to a DRX configuration is provided. The device is configured to perform the other method aspect. Alternatively or in addition, the device may comprise an enabling unit configured to selectively enable, depending on the DRX configuration, a receiver for receiving a power saving signal from the node. The device may further comprise a determining unit configured to determine, based on the receiver enabled for receiving the power saving signal, whether data is available for reception from the node. The device may further comprise a receiving unit configured to receive, if the data is available, from the node on a radio resource according to the DRX configuration at least one of the data and a scheduling assignment for the transmission of the data.

As to a still further aspect, a device for transmitting data from a node of a radio access network (RAN) to a radio device that is configured for discontinuous reception (DRX) according to a DRX configuration is provided. The device comprises at least one processor and a memory. Said memory comprises instructions executable by said at least one processor whereby the device is operative to determine whether data is available for transmission to the radio device. Execution of the instructions further causes the device to be operative to selectively transmit a power saving signal to the radio device depending on the DRX configuration. Execution of the instructions further cause the device to be operative to transmit, if the data is available, to the radio device on a radio resource according to the DRX configuration at least one of the data and a scheduling assignment for the transmission of the data.

As to a still further aspect, a device for receiving data from a node of a radio access network (RAN) at a radio device that is configured for discontinuous reception (DRX) according to a DRX configuration is provided. The device comprises at least one processor and a memory. Said memory comprises instructions executable by said at least one processor whereby the device is operative to selectively enable, depending on the DRX configuration, a receiver for receiving a power saving signal from the node. Execution of the instructions further cause the device to be operative to determine, based on the receiver enabled for receiving the power saving signal, whether data is available for reception from the node. Execution of the instructions further cause the device to be operative to receive, if the data is available, from the node on a radio resource according to the DRX configuration at least one of the data and a scheduling assignment for the transmission of the data.

As to a still further aspect, a device for transmitting data from a node of a radio access network (RAN) to a radio device that is configured for discontinuous reception (DRX) according to a DRX configuration is provided. The device may comprise one or more modules for performing the one method aspect. Alternatively or in addition, the device comprises a determination module for determining whether data is available for transmission to the radio device. The device further comprises a signal transmission module for selectively transmitting a power saving signal to the radio device depending on the DRX configuration. The device further comprises a data transmission module for transmitting, if the data is available, to the radio device on a radio resource according to the DRX configuration at least one of the data and a scheduling assignment for the transmission of the data.

As to a still further aspect, a device for receiving data from a node of a radio access network (RAN) at a radio device that is configured for discontinuous reception (DRX) according to a DRX configuration is provided. The device may comprise one or more modules for performing the other method aspect. Alternatively or in addition, the device comprises an enablement module for selectively enabling, depending on the DRX configuration, a receiver for receiving a power saving signal from the node. The device further comprises a determination module for determining, based on the receiver enabled for receiving the power saving signal, whether data is available for reception from the node. The device further comprises a reception module for receiving, if the data is available, from the node on a radio resource according to the DRX configuration at least one of the data and a scheduling assignment for the transmission of the data.

Any one of the devices (or any node or station for embodying the technique) may further include any feature disclosed in the context of the corresponding one of the method aspects. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
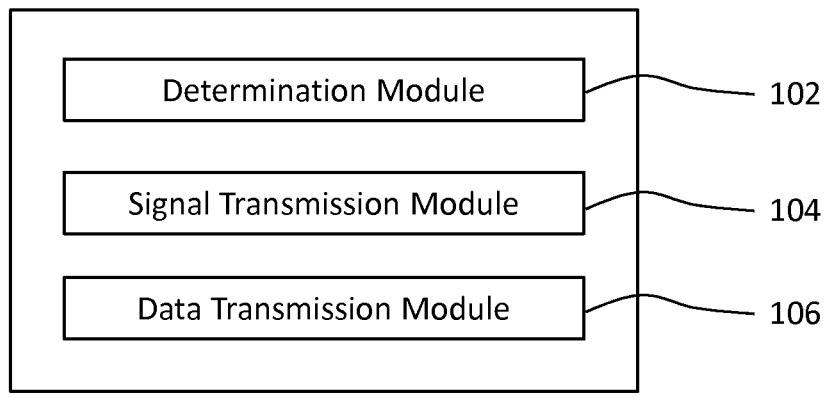
FIG. 1 shows a schematic block diagram of a device for transmitting data from a node of a RAN to a radio device configured for DRX according to a DRX configuration.

FIG. 1 schematically illustrates a block diagram of a device for transmitting data from a node of a radio access network (RAN) to a radio device that is configured for discontinuous reception (DRX) according to a DRX configuration. The device is generically referred to by reference sign 100.

The device 100 comprises a determination module 102 that determines whether data is available for transmission to the radio device. The device 100 further comprises a signal transmission module 104 that selectively transmits a power saving signal to the radio device depending on the DRX configuration. If the data is available, a data transmission module 106 of the device 100, which may also be implemented by the module 104, transmits to the radio device on a radio resource according to the DRX configuration at least one of the data and a scheduling assignment for the transmission of the data.

The device 100 may be connected to and/or part of the RAN. The device 100 may be embodied by or at the node of the RAN, other nodes connected to the RAN for controlling the base station or a combination thereof. The device 100 may be spatially separated from the radio device.

Any of the modules of the device 100 may be implemented by units configured to provide the corresponding functionality.

Figure 2:
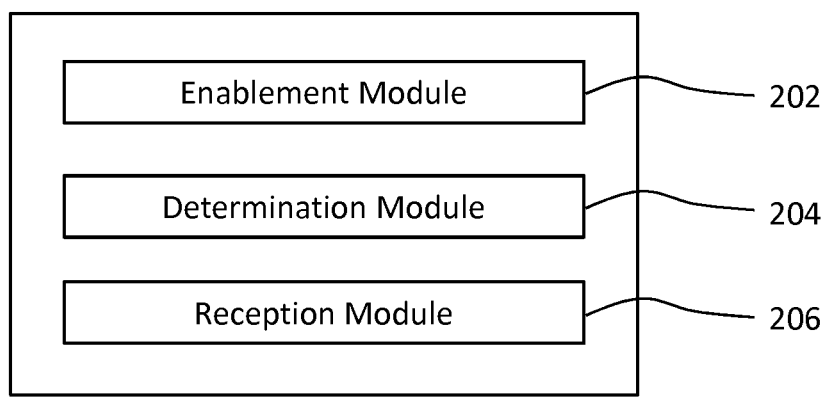
FIG. 2 shows a schematic block diagram of a device for receiving data from a node of a RAN at a radio device configured for DRX according to a DRX configuration.

FIG. 2 schematically illustrates a block diagram of a device for receiving data from a node of a radio access network (RAN) at a radio device that is configured for discontinuous reception (DRX) according to a DRX configuration. The device is generically referred to by reference sign 200.

The device 200 comprises an enablement module 202 that selectively enables, depending on the DRX configuration, a receiver for receiving a power saving signal from the node. The device 200 further comprises a determination module 204 that determines, based on the receiver enabled for receiving the power saving signal, whether data is available for reception from the node. If the data is available, a reception module 206 of the device 200 receives from the node on a radio resource according to the DRX configuration at least one of the data and a scheduling assignment for the transmission of the data.

The device 200 may be connected to and/or part of the radio device. The device 200 may be embodied by or at the radio device. The device 200 may be spatially separated from the node and/or the RAN.

Any of the modules of the device 200 may be implemented by units configured to provide the corresponding functionality.

The node may also be referred to as a base station. The node may be configured to provide radio access. The node may encompass a network controller (e.g., a Wi-Fi access point) or a radio access node (e.g. a 3G Node B, a 4G eNodeB or a 5G gNodeB) of the RAN.

Alternatively or in addition, an instance of the radio device may include a mobile or portable station or any radio device connectable to the RAN. Each radio device may be a user equipment (UE) and/or a device for machine-type communication (MTC), particularly enhances MTC (eMTC). Two or more radio devices may be configured to wirelessly connect to each other, e.g., via 3GPP sidelinks and/or according to a scheduling provided by the node.

Each aspect, or a further aspect, of the technique may be implemented as a configuration of the applicability of the power saving signal, e.g., for paging. Embodiments of the technique may be compatibility with section 7 of the document 3GPP TS 36.304, e.g., version 14.3.0.

Embodiments of the technique provide a flexible configuration of the power saving signal such that the network can choose not to configure the power saving signal, e.g., when usage of the power saving signal is not be expected to give any power consumption gains (e.g., at the radio device). The DRX configuration to use the power saving signal, i.e., the signal configuration, may be based on a key parameter, e.g., a threshold value. The signal configuration, e.g., the key parameter, may be communicated to radio devices, which apply the power saving signal according to the step 402, e.g., depending on a value of the key parameter being above (or below) the threshold value. For example, a length threshold value for the length of a DRX or extended DRX (eDRX) cycle may be broadcasted in System Information. Only radio devices configured with DRX cycles shorter than the length threshold value monitor the paging in the step 406 with the use of the power saving signal in the steps 402 and 404. Alternatively or in addition, the signal configuration, i.e., the DRX configuration for the power saving signal, may be radio device-specific. For example, a signal configuration Information Element (IE) may be added to the radio device context (e.g., the UE context) stored in the network, e.g., a mobility management entity (MME).

Further DRX configurations of the power saving signal, i.e., signal configurations, may involve (e.g., depend on or define threshold value in terms of) properties of the power saving signal, e.g., the resource allocation of the power saving signal. For example, the node (or a cell of the node) may be specified only for a certain coverage, e.g., in terms of a maximum coupling loss (MCL). Relating the signal configuration to properties of the power saving signal can limit a network overhead. The signal configuration may depend on measurements or reports of the radio device or measurements or a load of the network. The signal configuration may be cell-specific (e.g., in terms of the MCL) or radio device-specific. For example, the signal configuration may depend on the MCL and/or the length of the power saving signal so that a sufficiently long (for reception at the radio device) but not excessively long (for limiting the network overhead) power saving signal is transmitted in the step 304. If a length sufficient for reliable reception at the radio device violates a criterion on the network overhead, the power saving signal may be deactivated, i.e., not transmitted by the node in step 304 and not expected to be received by the radio device 402, according to the signal configuration.

Figure 3:
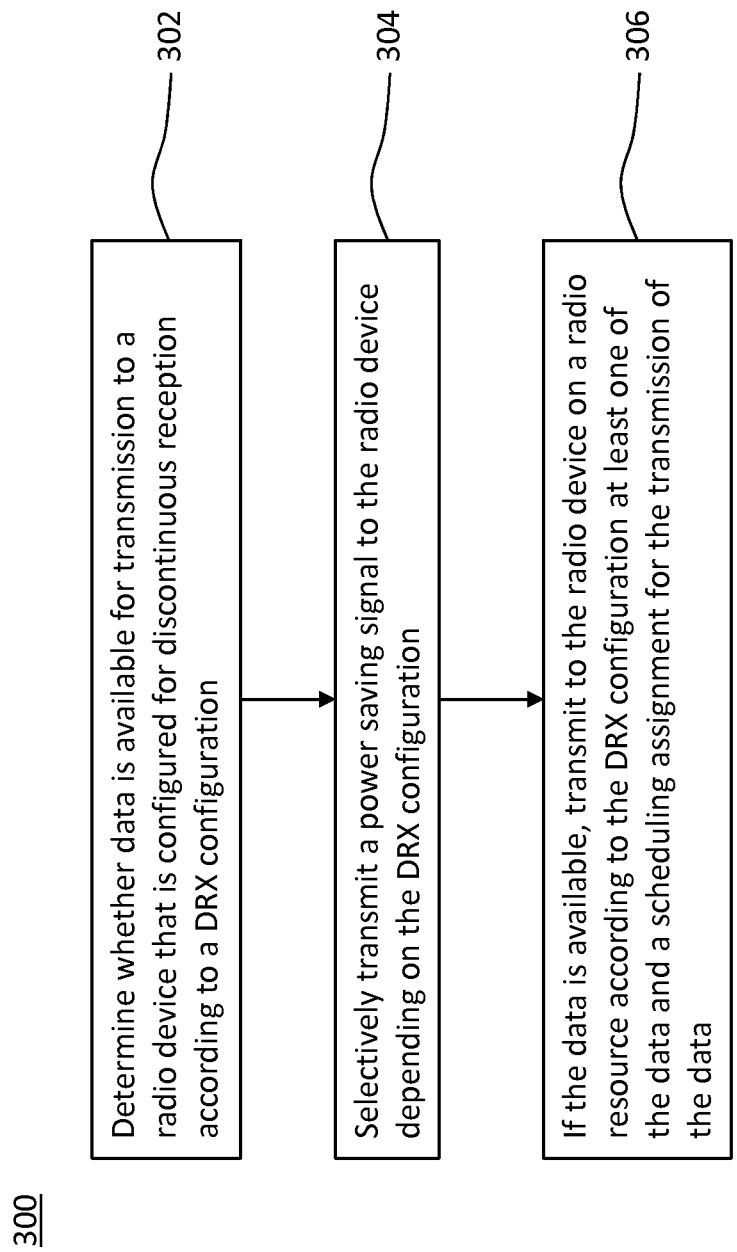
FIG. 3 shows a flowchart for a method of transmitting data from a node of a RAN to a radio device configured for DRX according to a DRX configuration, which is implementable by the device of FIG. 1.

FIG. 3 shows a flowchart for a method 300 of transmitting data from a node of a RAN to a radio device that is configured for DRX according to a DRX configuration.

The method 300 comprises a step 302 of determining whether data is available for transmission to the radio device. In a step 304 of the method 200, a power saving signal is selectively transmitted to the radio device depending on the DRX configuration. If the data is available, at least one of the data and a scheduling assignment for the transmission of the data is transmitted to the radio device on a radio resource according to the DRX configuration in a step 306 of the method 300.

The method 300 may be performed by the device 100, e.g., at or using the node of the RAN. For example, the modules 102, 104 and 106 may perform the steps 302, 304 and 306, respectively.

The data may comprise at least one of user data and control data. The availability may relate to the availability of at least one of user data and control data for the radio device, e.g., available at the node. That is, the term "data" (e.g., the control data) may encompass control signaling to the radio device.

DRX may encompass extended DRX (eDRX), e.g., according to the document 3GPP TS 36.304, version 13.3.0 (or later). The DRX configuration may be specific for and/or dedicated to the radio device. Alternatively or in addition, the DRX configuration may be specific for and/or dedicated to a group of radio devices, the node or a cell of the RAN.

Moreover, the step of transmitting on a radio resource according to the DRX configuration at least one of the data and a scheduling assignment for the transmission of the data may be briefly referred to as data transmission according to the DRX configuration. The radio resource according to the DRX configuration may be referred to as a transmission opportunity, e.g., independent of whether the radio resource is used for transmitting at least one of the data and a scheduling assignment for the transmission of the data.

The selectivity in the step of selectively transmitting the power saving signal may relate to whether or not the power saving signal is transmitted (e.g., after the determining step and before the data transmission) based on the DRX configuration. Selectively transmitting the power saving signal depending on the DRX configuration of the radio device may encompass that the power saving signal is transmitted only if the DRX configuration specifies that the power saving signal is to be transmitted. In other words, the DRX configuration specifying the usage of the power saving signal may be a necessary condition for transmitting the power saving signal.

The power saving signal may also be referred to as configurable power saving signal, as pre-transmission signal or as configurable pre-transmission signal.

The DRX configuration for the selective transmission of the power saving signal may be referred to as signal configuration. The signal configuration may be included in the DRX configuration or may be handled separately (e.g. represented by a separate structure of the configuration and/or separately transmitted to the radio device). The signal configuration may be expressly indicative of whether or not the power saving signal is to be transmitted in the step of selectively transmitting the power saving signal. Alternatively or in addition, the signal configuration may comprise or refer to a parameter (e.g., a DRX parameter, such as a length of a DRX cycle) that implies whether or not the power saving signal is to be transmitted in the step of selectively transmitting the power saving signal. A signal configuration that specifies for the radio device that the power saving signal is to be used may also be referred to as an active signal configuration.

At least one of the selectivity and the power saving signal may depend on the DRX configuration. The DRX configuration may specify whether or not the power saving signal is to be transmitted by the node, and/or whether or not the radio device is to enable its receiver for receiving the power saving signal. Alternatively or in addition, the DRX configuration may specify the power saving signal, e.g., as to a length in the time domain, a number of repetitions, a bandwidth in the frequency domain and a transmit power of the power saving signal.

The power saving signal may be specific for the radio device (e.g., UE-specific) or specific for the node (e.g., cell-specific).

The power saving signal may be indicative of a result of the determination. The power saving signal may be indicative of whether or not data is available for transmission to the radio device. For example, the power saving signal may be indicative of the availability of data to be transmitted to the radio device.

Alternatively or in addition, the power saving signal may comprise a wake-up signal (WUS). Selectively transmitting the power saving signal may be subject to further conditions. For example, selectively transmitting the power saving signal depending on the DRX configuration may encompass that the power saving signal is transmitted only if the DRX configuration specifies that the power saving signal is to be transmitted and if the data is available.

The DRX configuration for the selective transmission of the power saving signal, particularly the WUS, may be referred to as WUS configuration. The WUS configuration may be included in the DRX configuration or may be handled separately (e.g. represented by a separate structure of the configuration and/or separately transmitted to the radio device). The WUS configuration may be expressly indicative of whether or not the WUS is to be transmitted in the step of selectively transmitting the WUS. Alternatively or in addition, the WUS configuration may comprise or refer to a parameter (e.g., a DRX parameter, such as a length of a DRX cycle) that implies whether or not the WUS is to be transmitted in the step of selectively transmitting the WUS.

The WUS may be transmitted, if (e.g., only if) data is available for transmission to the radio device as a result of the determination. The transmission of the WUS only if data is available may be referred to as discontinuous transmission (DTX) of the node (node DTX) and/or of the WUS (WUS DTX).

The transmission of the WUS in the step of selectively transmitting the WUS may be (e.g., implicitly) indicative of the availability of data for transmission to the radio device. The WUS may or may not carry content that is expressly indicative of the availability.

Alternatively or in addition, the power saving signal may be indicative of the unavailability or absence of data to be transmitted to the radio device. The power saving signal may be referred to as a go-to-sleep signal (GTS). Selectively transmitting the power saving signal may be subject to further conditions. For example, selectively transmitting the power saving signal depending on the DRX configuration may encompass that the power saving signal is transmitted only if the DRX configuration specifies that the power saving signal is to be transmitted and if the data is not available, i.e., unavailable or absent. The GTS may be selectively transmitted if data is not available for transmission to the radio device as a result of the determination. The transmission of the GTS in the step of selectively transmitting the GTS may be (e.g., implicitly) indicative of the unavailability or absence of data for transmission to the radio device. The GTS may or may not carry content that is expressly indicative of the unavailability or absence.

In a first implementation, the power saving signal is transmitted prior to each transmission opportunity. For example, either the WUS or the GTS is transmitted prior to each transmission opportunity according to the result of the determination. Such power saving signal may also be referred to as "WUS-GTS" or "WUS without DTX". In a second implementation, the power saving signal is the WUS and transmitted prior to (e.g., only) those transmission opportunities for which data is available according to the determination. Such power saving signal may also be referred to as "WUS or DTX".

The selective transmission of the WUS may be triggered by the availability of the data for transmission to the radio device. Alternatively or in addition, the selective transmission of the GTS may be triggered by the unavailability or absence of the data for transmission, e.g., in relation to the next transmission opportunity.

The radio resource according to the DRX configuration may comprise an active interval of the radio device according to the DRX configuration.

The transmission opportunity may comprise a time interval during which the radio device is active, e.g., enabled to receive the power saving signal according to the DRX configuration. The DRX configuration may comprise an inactive interval (or sleep state) and an active interval (or active state). The inactive interval may be multiple times longer than the active interval. The DRX configuration may specify at least one of beginning, end and duration of the active interval. A receiver unit (e.g., an antenna amplifier) of the radio receiver may be enabled (e.g., operative or supplied with electrical power) during the active interval. The receiver unit may be disabled (e.g., inoperative or not supplied with electrical power) during the inactive interval.

The power saving signal may be transmitted at or before the beginning of the active interval according to the DRX configuration. The power saving signal (e.g., the WUS) may be transmitted in the first subframe or the first transmission time interval (TTI) of the active interval. Alternatively or in addition, the power saving signal may be transmitted one subframe or one TTI prior to the beginning of the active interval.

The radio resource according to the DRX configuration, i.e., the transmission opportunity, which may be available for transmitting the scheduling assignment, may comprise a physical downlink control channel (PDCCH, e.g., NPDCCH or MPDCCH) to the radio device. The radio resource according to the DRX configuration may be on a PDCCH, e.g., for Narrowband IoT (NPDCCH) or for machine-type communication (MPDCCH). The node may transmit downlink control information (DCI) in the transmission opportunity.

The DRX configuration may comprise a signal configuration indicative of whether or not the power saving signal is to be transmitted in the selective transmission. The signal configuration may comprise at least one information element (IE). For example, an IE indicative of whether or not the WUS is to be transmitted in the selective transmission may be referred to as WUS IE. Alternatively or in addition, an IE indicative of whether or not the GTS is to be transmitted in the selective transmission may be referred to as GTS IE. Whenever referring to the "signal configuration" herein, the "signal configuration" may be implemented by at the least one IE, e.g., the WUS IE and/or the GTS IE.

The signal configuration may indicate (e.g., for the relation between the node and the radio device) whether or not the power saving signal is to be used, i.e., the selectivity in the selective transmission step. The signal configuration (e.g., one of the IEs) may apply to multiple transmission opportunities. Given the signal configuration indicates that the power saving signal is to be used, an individual decision for the next transmission opportunity whether or not the WUS (as an instance of the power saving signal) is transmitted may depend on the availability of the data or the content of the transmitted power saving signal may depend on the availability of the data.

The method may further comprise a step of transmitting at least one of the DRX configuration and the signal configuration to the radio device. The DRX configuration or the signal configuration may be, e.g., partly or completely, broadcasted or transmitted to the radio device. The signal configuration (e.g., the at least one IE, the WUS configuration, the WUS IE and/or the GTS IE) may be transmitted to the radio device. The DRX configuration may be a structure under a Main Configuration of the Medium Access Control (MAC) layer. The signal configuration may be part of the DRX configuration or may be transmitted separately.

Herein, the network may comprise the RAN and/or a core network (CN) connected to the RAN. The CN may comprise a mobility management entity (MME). The RAN may comprise an evolved UMTS Terrestrial RAN (E-UTRAN) or a New Radio network. The CN may be an Evolved Packet Core (EPC) or a successor thereof according to 3GPP.

The DRX configuration, the signal configuration or a part of the signal configuration may be transmitted to the radio device at an initial attach to the network. Alternatively or in addition, the DRX configuration or the signal configuration may be transmitted (e.g., modified) upon a tracking-area update (TAU). The DRX configuration, the signal configuration or a part of the signal configuration may be transmitted from the CN to the radio device (e.g., through the node of the RAN and/or using a non-access stratum, NAS, signaling).

The method may further comprising a step of receiving a message from a core network (CN) connected to the RAN or a mobility management entity (MME) connected to the RAN.

The RAN (e.g., the node) and the CN (e.g., the MME) may be connected for control plane signaling. The message may be received according to an Application Protocol (S1-AP) through an S1 interface between the RAN and the CN.

Furthermore, the message received from the CN and/or the MME at the node and the signal configuration transmitted from the node to the radio device may be identical. For example, the message from the CN and/or the MME may be forwarded to the radio device. Alternatively or in addition, the signal configuration may comprise, partly or completely, the message or the node may derive the signal configuration from the message. For example, the signal configuration transmitted to the radio device may be more specific than the message received from the CN and/or the MME (e.g., as to usage of the power saving signal). The message received from the MME may indicate whether or not the power saving signal is to be used (e.g., the selectivity). The signal configuration transmitted to the radio device may indicate if the WUS only (e.g., the second implementation of the power saving signal), the GTS only or the power saving signal indicating WUS or GTS (e.g., the first implementation of the power saving signal).

The message may be indicative of the availability of the data for the transmission to the radio device. The step of determining the availability may include the step of triggering and/or receiving the message.

The message may be a paging message. The paging message may be indicative of a paging request. The paging request may be triggered by the CN, e.g., to initiate a call (e.g., terminated at the radio device) or trigger the radio device to re-acquire system information. The paging message may be transmitted to a plurality of nodes of the RAN in a tracking area (TA) associated with the radio device.

The message may be indicative of the signal configuration or a part of the signal configuration.

The selective transmission of the power saving signal to the radio device may depend on the message from the MME. The selective transmission of the WUS may depend on the signal configuration or a part of the signal configuration. The message from the MME may be indicative of the at least one IE.

The message may be indicative of the signal configuration or the part thereof, e.g., the WUS configuration, at least one of the IEs, the WUS IE or the GTS IE. The signal configuration may be, e.g., partly or completely, stored at the MME in the context of the radio device.

The signal configuration or the part of the signal configuration may be included in or appended to the message. The signal configuration or the part of the signal configuration may be appended to an existing format of the paging message.

The length of the power saving signal, e.g., the WUS, may be specific for the radio device (e.g., UE-specific).

The message may be indicative of a coverage enhancement level for the radio device. A number of radio resources used for transmitting the power saving signal may depend on the coverage enhancement level.

The coverage enhancement level may be stored at the MME in the context of the radio device, e.g., according to sections 8.3.3 and 8.3.7 of the document 3GPP TS 36.413, e.g., version 13.6.0 or 14.3.0. The node may report the coverage enhancement level upon the release of the connection of the radio device, e.g., according to section 9.1.4.7 of the document 3GPP TS 36.413, e.g., version 13.6.0 or 14.3.0. The node may receive the coverage enhancement level appended to the message from the MME.

A number of radio resources used for transmitting the power saving signal may depend on a category of the radio device. The node, the RAN or the network may support a predefined catalog of categories (e.g., device-categories) for radio devices. The radio device may be associated with one of the categories. The capabilities of radio devices belonging to different categories may be different, e.g., as to a bandwidth for radio communication with (e.g., reception) from the node.

Determining that data is available may trigger sending a configuration request to the CN or the MME. The message may be received in response to the configuration request.

The configuration request may request the DRX configuration, the signal configuration or the part of the signal configuration, e.g., the WUS configuration. The message received in response to the configuration request may also be referred to as signal configuration response or WUS response.

When the node determines that there is data to be transmitted to the radio device, the node may query the CN, e.g., the MME, to retrieve the message. The message may be indicative of the signal configuration or the part of the signal configuration for the radio device. Based on the message, the node selectively transmits the WUS before transmitting the data or the corresponding scheduling assignment to the radio device. In other words, the message informs the node whether or not the node has to wake-up the radio device.

Moreover, the node (or a cell of the node) may serve a plurality of such radio devices or a plurality of the radio devices may camp on the node (or a cell of the node). The data for transmission to the radio device may be data to be broadcasted to (e.g., some of) the plurality of radio devices. For example, the data may comprise system information of the node. The WUS response from the MME may be indicative of the presence of at least one radio device in the cell of the node or in the TA of the node, which are configured for DRX with the WUS, i.e., an active signal configuration for the WUS.

The radio device may be in an idle mode relative to the RAN. The radio resource according to the DRX configuration may be a paging occasion (PO) in a paging frame (PF) according to the DRX configuration. The idle mode may be an idle state of the radio device according to a radio resource control (RRC) protocol for the RAN.

The radio device may be in a connected mode relative to the RAN. The radio resource according to the DRX configuration may be an active state according to the DRX configuration for the connected mode. The connected mode may be a connected state of the radio device according to the RRC protocol for the RAN.

The DRX configuration of the radio device may define DRX cycles. Each of the DRX cycles may comprise the radio resource according to the DRX configuration for transmitting to the radio device.

The selectivity in the selective transmission (i.e., whether or not the power saving signal is to be used at all) may apply to multiple cycles. The individual decision in each cycle whether or not the WUS is transmitted, whether or not the GTS is transmitted, and/or as to the content of the power saving signal may depend on the determining step performed for the corresponding DRX cycle.

The radio resource for transmitting (e.g., of the data and/or the scheduling assignment) to the radio device may repeat periodically. The DRX cycle may comprise the active interval and the inactive interval. A time domain of the radio resource for transmitting to the radio device may be the active interval.

The selective transmission of the power saving signal may depend on a usage of the radio resources for transmitting to the radio device in previous of the DRX cycles. For example, if more of the radio resources are used for the transmission (e.g., of data and/or scheduling assignments) to the radio device (e.g., than in the past for this radio device or as compared to another radio device), the WUS configuration may be deactivated for the radio device, so that no WUS are transmitted in the selective transmission according to the DRX configuration (i.e., according to the WUS configuration). The DRX configuration for the selective transmission of the WUS may depend on a fraction of the used radio resources (e.g., used paging occasions) in the DRX cycles.

For example, if at least a predefined first fraction (e.g., 50%) of the radio resources available according to the DRX cycles are used for the transmission to the radio device, the DRX configuration of the radio device may specify for the selective transmission that no WUS be transmitted. Alternatively or in addition, if less than a predefined second fraction (which may be equal to or less than the first fraction, e.g., 20%) of the radio resources available for transmission are used for the transmission to the radio device, the DRX configuration of the radio device may specify for the selective transmission that the WUS be transmitted (provided data is available).

The selective transmission of the power saving signal may depend on a length of the DRX cycles configured for the radio device according to the DRX configuration. For example, the DRX configuration for the selective transmission of the power saving signal (i.e., the signal configuration) may specify that the power saving signal is to be transmitted depending on the length of the DRX cycle for the radio device.

The WUS may be selectively transmitted to the radio device if the length of the DRX cycle for the radio device is equal to or less than a length threshold value. For example, the DRX configuration for the selective transmission of the WUS (i.e., the WUS configuration) may specify that the WUS is not to be transmitted if the length of the DRX cycle for the radio device exceeds the length threshold value. For example, the longer the length of the DRX cycle, the greater may be the probability for the availability of data at the transmission opportunity. Hence, transmitting the WUS may become ineffective, because the WUS has to be transmitted in almost each of the DRX cycles. In other words, the WUS configuration may specify that the WUS is to be used (provided data is available) below the length threshold value. Alternatively or in addition, the GTS configuration may specify that the GTS is to be used (provided data is unavailable) above the length threshold value or another length threshold value.

The method may further comprise a step of broadcasting the length threshold value in system information. The node may broadcast a system information block (SIB) indicative of the signal configuration or the part of the signal configuration, e.g., the length threshold value for the length of the DRX cycle.

The DRX configuration of the radio device may include a status of a power saving mode (PSM) for the radio device. The WUS may be selectively transmitted if the PSM is active. The signal configuration may specify that the WUS is to be used (provided data is available) if the PSM is active, or the signal configuration may specify that the WUS is not to be used if the PSM is inactive, e.g., because the radio device with active PSM has less demand for traffic and more demand for saving energy compared to a radio device not in PSM. Alternatively, the signal configuration may specify that the WUS is to be used (provided data is available) if the PSM is inactive, or the signal configuration may specify that the WUS is not to be used if the PSM is active, e.g., because the transmission opportunities of the PSM are most likely used due to their rareness.

The length of the DRX cycle or a length of the inactive interval may be between one hour and one day for the PSM. For the PSM, the radio device may specify the length of the DRX cycle or the length of the inactive interval. The radio device may report the length of the DRX cycle or the length of the inactive interval to the node of the RAN.

The WUS may be selectively transmitted to the radio device, if a quality of service (QoS) requirement or a QoS class identifier (QCI) for the radio device is equal to or greater than a quality threshold value. The QoS may include latency. By activating the signal configuration, i.e., by using the WUS (provided data is available), more transmission opportunity can be allocated to the radio device (e.g., shorter DRX cycles), and thus deceasing latency, essentially without increase in power consumption at the radio device due to the energy efficient WUS reception at the radio device.

The power saving signal may be selectively transmitted to the radio device depending on a history of data transmission to the radio device. The signal configuration may be changed depending on the history of data transmissions to the radio device, e.g., a past usage of, or traffic, in the transmission opportunities. Alternatively or in addition, the signal configuration may specify that the WUS is to be used (i.e., transmitted provided data is available) depending on the past the history of data transmissions to the radio device.

The power saving signal may be selectively transmitted to the radio device depending on a reference signal received power (RSRP) or a reference signal received quality (RSRQ) reported by the radio device to the node. Above a threshold value for the RSRP or the RSRQ, the signal configuration may specify that the WUS is used (i.e., transmitted provided data is available), e.g., because the WUS (particularly a WUS that is short compared to a DCI message) is reliable for waking-up the radio device.

The power saving signal may be selectively transmitted to the radio device depending on a maximum coupling loss (MCL) supported by the node. The signal configuration may define a dependency on the MCL (i.e., a MCL threshold value) such that the WUS be used (i.e., transmitted provided data is available) only if the radio resources required for the WUS are less than (e.g., less than half of) the radio resources required for transmitting the scheduling assignment. For example, the node may support an MCL above the MCL threshold value (e.g., a large coverage area), wherein the WUS has to use radio resources (e.g., in the time domain) depending on the MCL in order to reliably wake-up the radio device.

The WUS may be selectively transmitted to the radio device depending on at least one of a length of the WUS and a length of downlink control information (DCI), e.g., including the scheduling assignment. The length of the WUS and/or the length of the DCI may be related to, e.g., proportional to, a number of repetitions of the WUS and/or a number of repetitions of the DCI, respectively. The length of the WUS and/or the length of the DCI may depend on at least one of a channel quality for the transmission from the node to the radio device, the RSRP, the RSRQ and the MCL.

The length of the WUS may be specific for the node (e.g., cell-specific). For example, the length of the WUS may depend on the MCL supported by the node. For example, the greater the MCL, the more radio resources (e.g., in the time domain) are used for the transmission of the WUS, e.g., for the transmission of the WUS in one DRX cycle.

The DRX configuration for the selective transmission of the power saving signal may depend on a scheduling at the node of the RAN. The DRX configuration for the selective transmission (i.e., the signal configuration) of the power saving signal (e.g., the WUS configuration for the selective transmission of the WUS) may depend on a scheduling of radio resources of the RAN at the node. For example, the greater the load of the node and/or the denser the scheduled radio resources of the RAN, the less WUSs may be transmitted according to the selective transmission.

The node may comprise a scheduler configured for scheduling at least one of scheduling assignments for data transmission and scheduling grants for data reception at the node. The DRX configuration of the radio device may specify for the selective transmission that no WUS be transmitted, if the radio resource for transmitting the WUS before or at the beginning of the active interval are already scheduled.

The DRX configuration for the selective transmission of the WUS may change from a first configuration to a second configuration. The first configuration may specify that the WUS be transmitted provided that the data is available. The second configuration may specify not using the WUS in response to failing to schedule a radio resource for the WUS. If data is available and the scheduler fails to schedule the WUS before the next transmission opportunity, the signal configuration may be changed to specifying that the WUS is not used (i.e., the second configuration).

Figure 4:
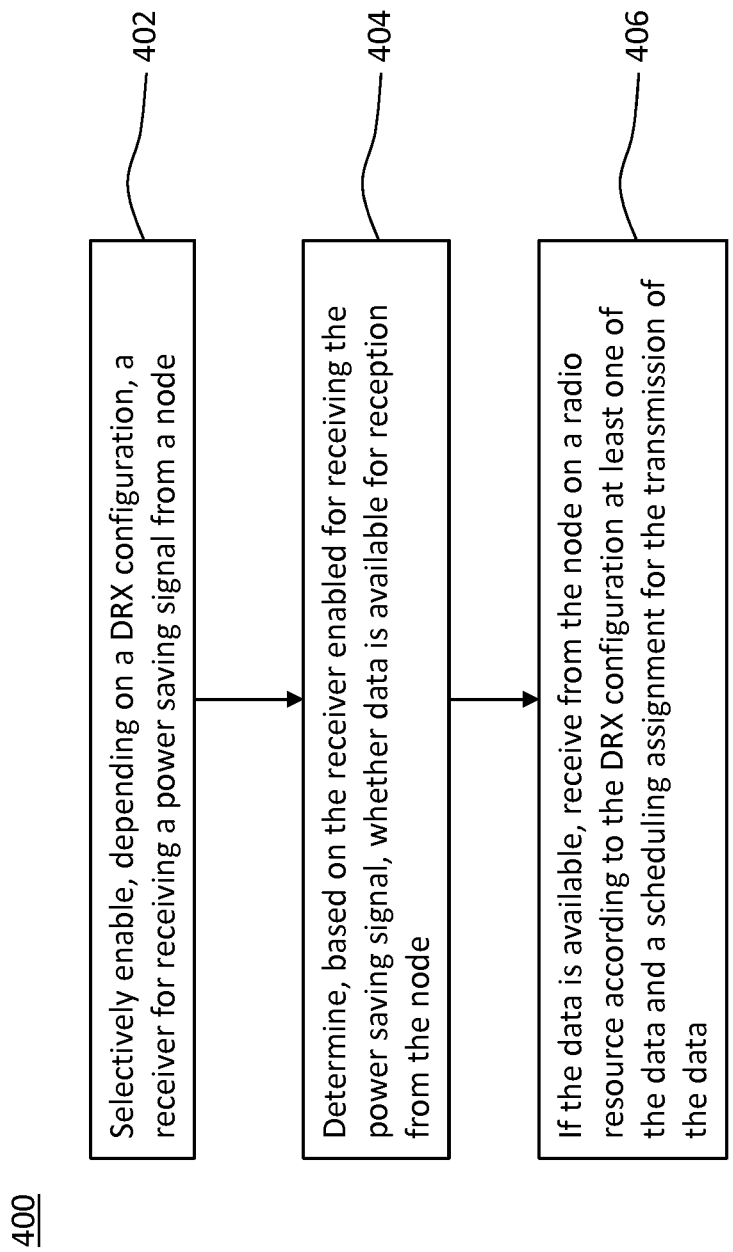
FIG. 4 shows a flowchart for a method of receiving data from a node of a RAN to a radio device configured for DRX according to a DRX configuration, which is implementable by the device of FIG. 2.

FIG. 4 shows a flowchart for a method 400 of receiving data from a RAN at a radio device that is configured for DRX according to a DRX configuration.

The method 400 may be performed by the device 200, e.g., at or using the radio device. For example, the modules 202, 204 and 206 may perform the steps 402, 404 and 406, respectively.

The method 400 comprises a step 402 of selectively enabling, depending on the DRX configuration, a receiver for receiving a power saving signal from the node. The method 400 further comprises a step 404 of determining, based on the receiver enabled for receiving the power saving signal, whether data is available for reception from the node. If the data is available, at least one of the data and a scheduling assignment for the transmission of the data is received from the node on a radio resource according to the DRX configuration according to the step 406.

The DRX configuration (e.g., the signal configuration) may specify that the power saving signal be used (e.g., that the WUS or the GTS be used), or that the power saving signal be not used. In other words, the DRX configuration (e.g., the signal configuration) may specify whether or not reception of the power saving signal is to be expected by the radio device in the step 402. Alternatively or in addition, the DRX configuration (e.g., the signal configuration) may specify the power saving signal, e.g., as to a length in the time domain, a number of repetitions, a bandwidth in the frequency domain and a transmit power of the power saving signal.

The receiver may be enabled, if the DRX configuration (e.g., the signal configuration) specifies that the power saving signal be used. Enabling the receiver (e.g., the receiver unit) may comprise supplying electrical power to the receiver. The receiver may be disabled prior to the step of selectively enabling the receiver.

The basis provided by the receiver enabled for receiving the power saving signal may comprise at least one of no signal reception, reception of the power saving signal being a WUS and reception of the power saving signal being a GTS. The reception of the WUS may be indicative of or imply that the data is available. The reception of the GTS may be indicative of or imply that the data is not available (unavailable or no data is available).

No signal reception may be indicative of or imply that the data is available or not available according to the DRX configuration (e.g., the signal configuration). For example, if the signal configuration specifies that WUS be used, no signal reception may be indicative of or imply that the data is not available. Alternatively or in addition, if the signal configuration specifies that GTS be used, no signal reception may be indicative of or imply that the data is available.

Any embodiment of the method 400 may further comprise any feature or step disclosed in the context of the method 300, particularly features or steps that correspond to those of the method 300 as the devices 100 and 200 communicate.

The power saving signal may comprise the wake-up signal (WUS). The WUS may be indicative of the data being available for reception from the node. The method may further comprise a step of disabling the receiver, if the data is not available.

The time and/or energy consumed for receiving the power saving signal may be less than (e.g., a fraction of) the time and/or energy necessary for receiving at least one of the data and a scheduling assignment for the transmission of the data. Disabling the receiver (e.g., the receiver unit) may comprise interrupting supply of electrical power to the receiver.

The method may further comprise a step of receiving from the node on a radio resource according to the DRX configuration at least one of the data and a scheduling assignment for the transmission of the data, if the DRX configuration specifies that the power saving signal be not used.

If the DRX configuration (e.g., the signal configuration) specifies that the power saving signal be not used (e.g., no WUS be used and no GTS be used), the receiver is preferably not enabled in the step 402 of selectively enabling the receiver (e.g., the receiver remains disabled). If the receiver is not enabled according to the DRX configuration of the radio device, the radio device may enable the receiver for receiving the radio resource according to the DRX configuration. The received radio resource may comprise at least one of the data and a scheduling assignment for the transmission of the data, or received radio resource may comprise no DCI for the radio device (which may imply that no data is available).

Figure 5:
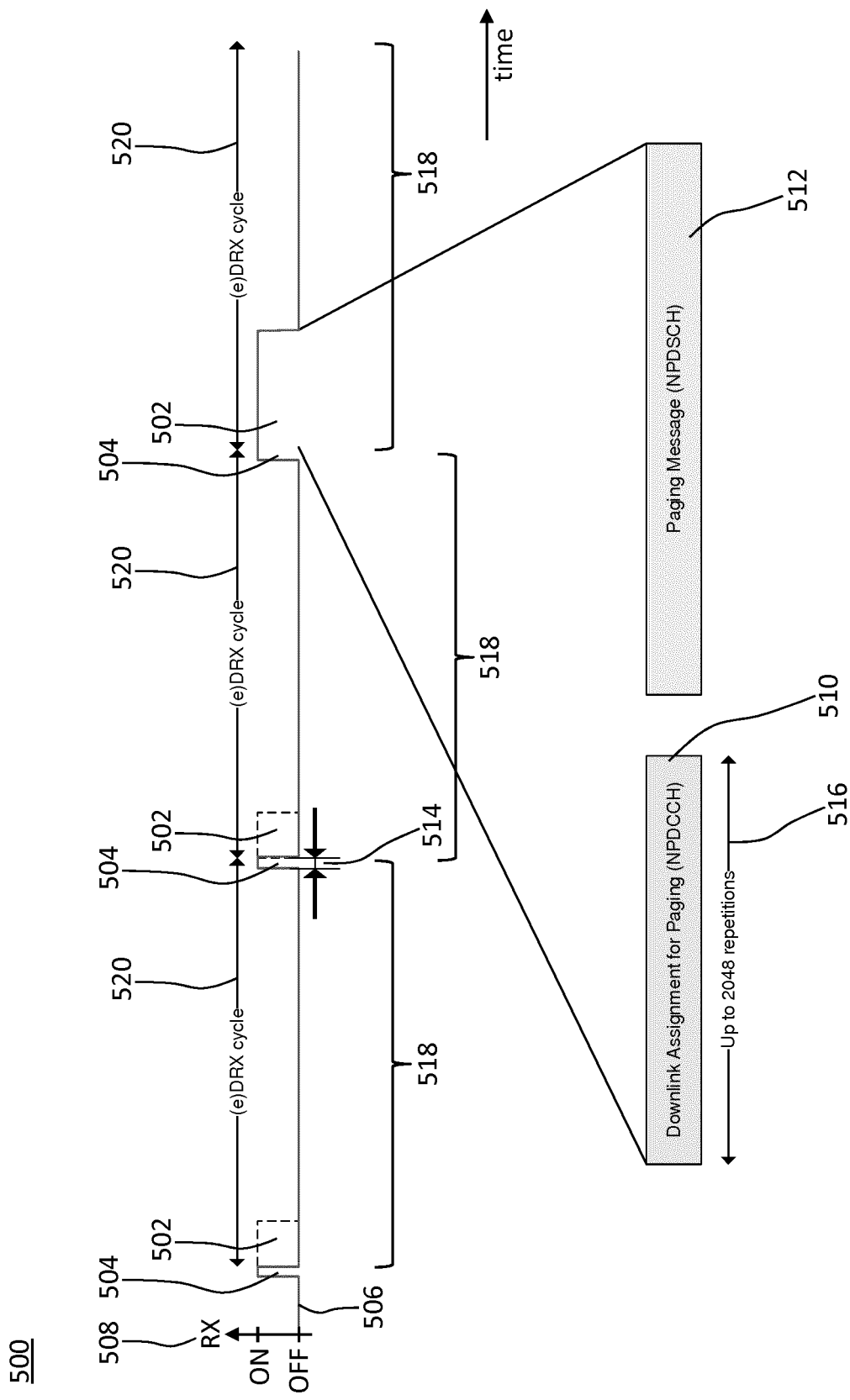
FIG. 5 schematically illustrates parameter for a DRX configuration, which are applicable in implementations of the methods of FIGS. 3 and 4.

FIG. 5 schematically illustrates a DRX configuration 500 comprising radio resources 502 according to the DRX configuration 500 as transmission opportunities. Depending on the signal configuration as part of the DRX configuration 500, the power saving signal 504 is selectively transmitted to preemptively inform the radio device of whether or not the transmission opportunity is used, i.e., whether or not there will be a data transmission for the radio device on the next radio resource 502.

In the DRX configuration 500 illustrated in FIG. 5, the signal configuration is activated, i.e., the power saving signal 504 can be transmitted according to the selective transmission 304 at the node, and the receiver is enabled according to the selective enablement 402 for reception of the power saving signal 504 at the radio device. A status 506 of a power supply 508 of the receiver at the radio device is illustrated as a function of time (increasing from left to right) in FIG. 5.

If the signal configuration as part of the DRX configuration 500 is activated, the power saving signal 504 can be transmitted by the node and can be received by the radio device. In a first implementation compatible with any embodiment, the power saving signal 504 is transmitted ahead of each transmission opportunity 502 and indicates whether or not there is data for transmission in the next transmission opportunity 502. In a second implementation compatible with any embodiment, the power saving signal 504 is transmitted ahead of the next transmission opportunity 502 only if there is data to be transmitted in this transmission opportunity 502. The power saving signal 504 according to the second implementation is also referred to as WUS.

The indication of the availability of data for transmission in the power saving signal 504 according to the first implementation, or the presence of the WUS 504 indicating the availability of data for transmission according to the second implementation, causes the radio device to enable its receiver in the step 406 for data reception on the radio resource 502 according to the DRX configuration, i.e., in the transmission opportunity. The radio device may maintain its receiver enabled for reception in the step 406 after enabling the receiver in the step 402. Alternatively, the radio device may disable the receiver after the step 402 for signal reception and re-enable the receiver for data reception in the step 406, e.g., if there is a gap between the radio resource for the power saving signal 504 and the radio resource 502 according to the DRX configuration, i.e., the transmission opportunity.

If DRX is activated and the signal configuration as part of the DRX configuration is deactivated, the node does not transmit the power saving signal 504 in the step 304, irrespective of whether or not there is data to be transmitted. According to such a DRX configuration, the radio device does not expect a power saving signal 504 and does not enable (i.e., provides no power to) its receiver in the step 402. The radio device enables (i.e., provides power to) its receiver for decoding, e.g., downlink control information, at each transmission opportunity 502.

Herein, the data may comprise user data and/or control data. For example, the transmission opportunity 502 may comprise downlink control information (DCI) as control data. If the DCI is indicative of a scheduling assignment 510, the radio device may continue to receive user data 512 according to the scheduling assignment 510.

The signal configuration may further specify a signal length 514 of the power saving signal 504. The signal length 514 may be cell-specific, e.g., according to a coverage range of the node defined in terms of a maximum coupling loss (MCL). Alternatively or in addition, the signal length 514 may be device-specific, e.g., according to a coverage enhancement level associated with the radio device. Moreover, the power signal range 504 may be related to a DCI length 516 of the DCI in the radio resource 502 according the DRX configuration, i.e., the transmission opportunity.

For example, the signal length 514 of the WUS 504 may be at most half or 10% of the DCI length 516. The signal length 514 and/or the DCI length 516 may be controlled by defining a number of repetitions for the power saving signal 504 and/or the DCI, respectively. For example, the number of repetitions for the power saving signal 504 may be equal to the number of repetitions for the DCI.

In the example for the DRX configuration 500 illustrated in FIG. 5, the DRX configuration 500 defines DRX cycles 518 with a DRX cycle length 520. That is, the radio resources 502 are periodic with a periodicity 520. In the first and second cycles 518 shown in FIG. 5, the power saving signal 504 is indicative of an unavailability of data (according to the first implementation) or the WUS 504 is absent (according to the second implementation), hence the radio device wakes up (i.e. supplies power to its receiver) for receiving the signal 504 and skips the reception in transmission opportunity 502 according to the step 406, since there is no transmission according to the step 306.

In one embodiment, the technique is applicable to an idle mode operation of the radio device for monitoring paging based on the power saving signal 504. The data 512 comprises a paging message. When the power saving signal 504 is activated according to the signal configuration, in every paging cycle 518, the radio device wakes up in the step 402 before its designated time window 502 (i.e., the transmission opportunity according to the DRX configuration 500) to check in the step 404 whether there is DCI for a paging message.

The paging cycle 518 may be configured as DRX cycle or eDRX cycle. The maximum DRX and eDRX cycles are 10.24 seconds and two hours, 54 minutes and 46 seconds, respectively. In a NB-IoT implementation, a paging message 512 is carried in NPDSCH and scheduled 510 by DCI format N2 carried in NPDCCH.

Multiplexing paging records for multiple radio devices within one paging message 512 is supported. Before the transmission 306 to multiple radio devices, the node may query the MME whether at least one of the multiple radio devices is configured for the power saving signal 504, i.e., the signal configuration is activated. If there is at least one radio device with activated signal configuration, the node transmits the power saving signal 504 to the at least one radio device.

For radio devices (e.g., UEs) in extreme coverage limited situations, up to 2048 repetitions 516 may be used for transmitting a DCI 510. Thus, a radio device may need to receive as many as 2048 subframes to determine whether there is a paging message 512 sent on the associated NPDSCH (e.g., starting 4 NB-IoT subframes from the end of last subframe of the NPDCCH 510). By way of example, in most DRX or eDRX cycles 518, however, no scheduling assignment (e.g., no DCI format N2) is sent at all during one DRX or eDRX cycle 518. Thus, from a power efficiency point of view, the radio device may stay awake in many cases for an unnecessarily long time attempting to decode the control data (e.g., the scheduling assignment, particularly a DCI format N2). Such waste of energy can be avoided by changing the DRX configuration, e.g., the signal configuration.

Figure 6:
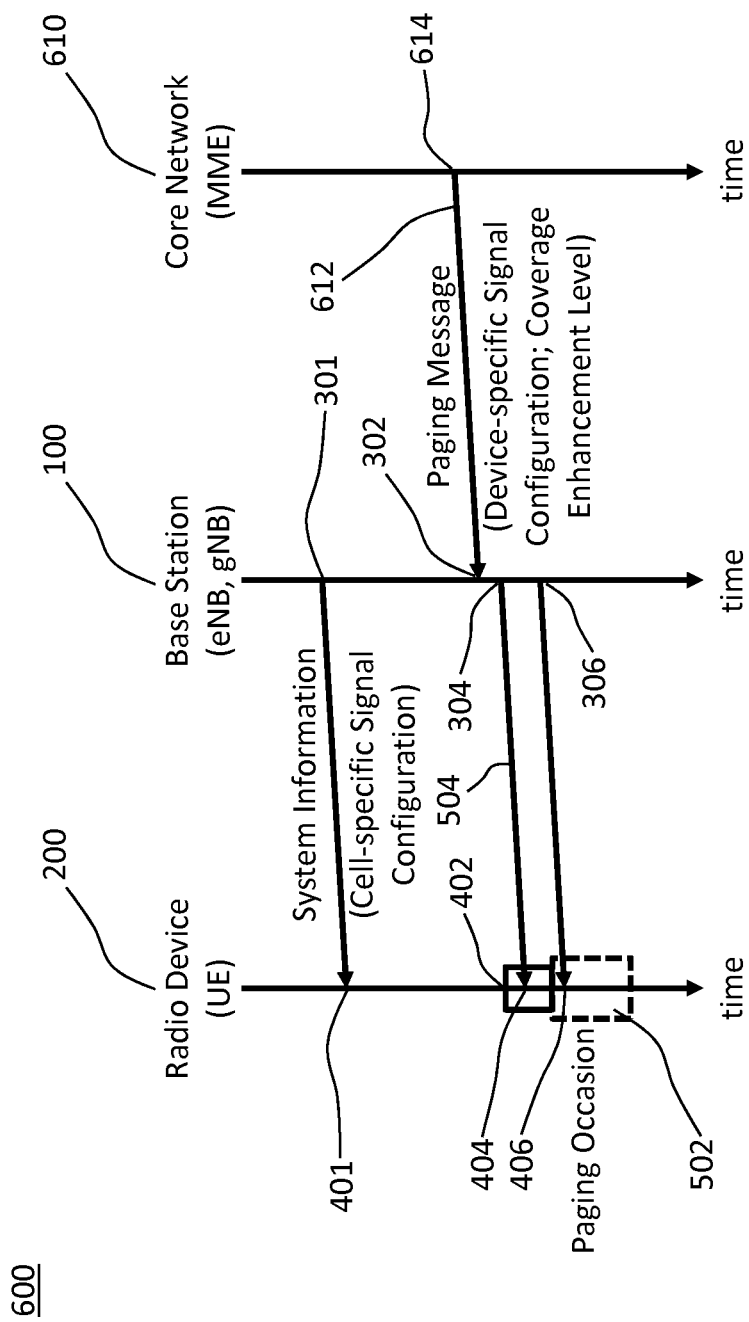
FIG. 6 shows a schematic signaling diagram for an embodiment of a RAN in communication with an embodiment of the device of FIG. 2.

FIG. 6 shows a schematic signaling diagram 600 for the communication between the device 100 implemented at the RAN (e.g., at the node) and the device 200 implemented at the radio device. Optionally, the communication further involves the CN 610 (e.g., the MME).

In a first embodiment, the use of the WUS is implicit from the setting of one or more key parameters, e.g. the eDRX cycle length. For example, the length threshold value of this parameter (e.g., an eDRX threshold for the WUS), is included to a System Information Block broadcasted by the node in a step 301. The radio devices (e.g., UEs) receive in a step 401 the system information and monitor the paging, in the step 406 based on the step 404, using the WUS 504 if the eDRX cycle they are configured with is equal to or shorter than this threshold. The rationale being that for a fixed traffic model, the probability that the radio device will be paged increases with the length of the eDRX cycle, hence reducing the power consumption gain brought by the WUS.

Alternatively or in addition, other key parameters than the eDRX may be used. Such key parameters may include at least one of whether or not the radio device is configured with a PSM, a certain QCI, subscription information, a historical record of data activity, RSRP measurement thresholds, the maximum number of repetitions 516 (e.g., referred to as Rmax) configured for the paging DCI 510, etc.

In embodiments based on such one or more of the key parameters, no additional or specific signaling to and/or from the node may be needed. The node (e.g., an eNB) may, e.g., based on the value of this key parameter, decide whether or not WUS must be sent in the step 304 when there is paging to the radio device (i.e., when the step 302 yields data is available).

In same of further embodiments, one or more of the key parameters is not known to the node, e.g. certain subscription information etc. In such case, this information (i.e., a value for this key parameter) may be appended to the message 612 from the CN 610, e.g., the Paging Request message from MME (in the CN) to eNB (as the node). Alternatively, a WUS-indication is included to the Paging Request message 610.

While the message 612 is triggered by a step 614 in the CN in the example illustrated in FIG. 6, the node may, alternatively or in addition, request the message 612.

In a second embodiment, which is combinable with the first embodiment, the network configures the radio devices (e.g., UEs) individually to monitor the WUS or not. That is, an information element (IE) indicative of whether or not the radio device is using WUS (i.e., whether or not the signal configuration is active) is included to the context of the radio device (e.g., the UE context) stored in CN 610 (e.g., at the MME). Preferably, the signal configuration is determined by the network (e.g., the CN 610). The signal configuration may be determined at an Initial Attach of the radio device to the network (e.g., the CN 610). At the Initial Attach, the radio device may receive the device-specific signal configuration. Optionally, the signal configuration is modified at a Tracking-Area Update (TAU).

In an implementation of the second embodiment, any NAS signaling may be used for communication between CN 610 and radio device, e.g., for transmitting the device-specific signal configuration to the radio device. Determining whether to configure a certain radio device (e.g., UE) for the usage of the WUS or not, and/or any radio device-specific parameters (e.g., UE-specific parameters) of the signal configuration, may be performed by the network (e.g., the CN, particularly the MME). Determining the WUS configuration, e.g., determining whether to use the WUS and/or determining the radio device-specific parameters of the WUS configuration may be based on the parameters and/or criteria given below in the WUS procedure.

Upon paging 614, a WUS-indication may be appended to the Paging Request message 612 sent from the MME to node (e.g., an eNB). If this WUS-indication is indicating that the radio device is using WUS for monitoring paging, the node must transmit in the step 304 the WUS prior to the NPDCCH/MPDCCH scheduling the paging message on (N)PDSCH according to the step 306, e.g., if WUS is supported by the node (e.g., eNB) and currently used by the node (e.g., eNB).

Additional parameters that may determine whether the radio device should monitor the WUS or not include a paging probability and a number of radio devices within the same paging occasion (PO).

In any of the above embodiments, WUS properties may be defined (e.g., the WUS resource allocation, particularly the length of the WUS), The WUS property may be UE-specific configured (e.g., by the MME) and/or cell-specific configured (e.g., commonly broadcasted in SI by the node). For example, the cell-specific WUS property may depend on a certain coverage (e.g., 150 dB MCL instead of the maximum, which may specified to be 164 dB MCL), which the node or the cell of the node is supporting. In this way, it is possible to reduce the resulting network overhead implied from transmitting the WUS 504. Other configurations, e.g., WUS sequence indexation, in order to distinguish the radio devices, is also possible.

In another embodiment, the network may configure a group of radio devices (e.g., UEs) whether to monitor the WUS based on UE coverage, e.g., based on the UE RSRP measurement or UE coverage. That is, the network may indicate, e.g., through SI (e.g., cell-specific configurations set by the node) or UE-specific configurations (e.g., stored by the MME), which radio devices (e.g., UEs) are instructed to monitor WUS prior to its one or more paging occasions. Using such a configuration step, the network may group radio devices (e.g., UEs) in similar situations (e.g., radio conditions), and arrange the WUS (e.g., the target coverage of the WUS) and the corresponding paging in an efficient way to minimize the overhead introduced by the WUS.

In a third embodiment, which is combinable with the first and/or second embodiment, the use of WUS (i.e., whether or not the signal configuration is active) may be based on a coverage of the radio device and/or an expectation of how often the radio device will be paged. For the radio devices that the network 610 knows will be paged often (i.e., a large probability that there will be paging in the PO), e.g., based on a counter in the corresponding context at the MME, it is better not to configure the WUS (i.e., the signal configuration is not active), due to the overhead and additional power consumption caused by the WUS 504.

This probability-dependence may be combined with the coverage of the radio device and/or the maximum number of repetitions (e.g., Rmax at reference sign 516 in FIG. 5 configured for the paging DCI on NPDCCH or MPDCCH). That is, if the network 610 knows the radio device will be paged often, and it needs a larger amount of repetitions to send the DCI for paging, then it is better not to configure the WUS for these radio devices (i.e., the signal configuration is not active).

In an implementation of the third embodiment, the presence of the WUS is conditioned on maximum number of repetitions (e.g., Rmax, used by NPDCCH or MPDCCH) carrying the paging DCI. If the Rmax is less than a threshold (e.g., 2 repetition), then the radio device may assume WUS is not used. This can also be combined with the method in the previous embodiments. For example, if the radio device is configured with a DRX cycle shorter than the length threshold, the radio device may assume that the WUS 504 is not used.

Paging may be used to not only a certain radio device in the cell, but all radio devices in the cell, e.g. for System Information change notification. In such case, it is beneficial for the node to know if there are WUS-capable radio devices (that is, radio devices that are configurable with an active signal configuration) and/or WUS-configured radio devices (that is, radio devices that are currently using the WUS according to an active signal configuration) in the Tracking-Area (TA). For this purpose, a requesting signaling from the node to the MME may be defined in a communication protocol (e.g., S1-AP). That is, the message from the MME may be pulled by the node. The requesting signal allows the node to send a request to the MME to see if there is at least one WUS-capable radio device and/or at least one WUS-configured radio device, before transmitting out the paging in the step 306. Alternatively or in addition, the node may store this parameter or IE, i.e. whether WUS should be used, for common paging. The MME may ensure that the node has an up-to-date knowledge. That is, the message is push by the MME to the node (e.g., triggered by a change in the signal configuration or IE stored in the corresponding radio device context). That is, the MME would notify the node if there are any changes of this information. For this request, a signaling is defined in the S1-AP.

A fourth embodiment is described. The fourth embodiment may be combined with features of any one of the above-mentioned three embodiments, and/or may be implemented as described below.

The signal configuration (e.g., the WUS configuration), or parts thereof, may be defined implicitly, e.g., based on one or more key parameters and corresponding threshold values for selectively activating or deactivating the usage of the power saving signal (e.g., the WUS). That is, the power saving signal is used or not used depending on a comparison between the current value of the key parameter and the corresponding threshold value. Alternatively or in addition, the signal configuration (e.g., the WUS configuration), or parts thereof, may be expressly defined, e.g., by transmitting a configuration message indicative of the signal configuration to the one or more radio devices.

Moreover, the signal configuration (e.g., the WUS configuration), or parts thereof, may be node-specific (e.g., cell-specific or "common") and/or radio device-specific (e.g., UE-specific). By way of example, the node-specific signal configuration may be broadcasted by the node to one or more may radio devices (e.g., by broadcasting system information comprising the node-specific signal configuration). The radio device-specific signal configuration may be transmitted on a channel dedicated to the corresponding radio device. For example, the RAN or the node may use radio resource control (RRC) signaling to transmit the radio device-specific signal configuration to the corresponding radio device. Alternatively or in addition, the CN or the MME may use NAS signaling to transmit the radio device-specific signal configuration to the corresponding radio device.

In a first example, the use of the WUS for a particular UE as the radio device may be determined by the MME. The UE-specific signal configuration of the particular UE may be communicated to the particular UE over NAS signaling from the MME. In a second example, which is combinable with the first example, the use of the WUS in a cell controlled by an eNB as the node may be determined by the eNB. The cell-specific signal configuration may be communicated to UEs by System Information broadcasted along with the cell-specific signal configuration.

An example for a signal configuration that is cell-specific signal and implicit comprises broadcasting in the system Information the length threshold value for the DRX cycle length (or eDRX cycle length) and/or a coupling threshold value for a coupling-loss or a path-loss (which may be more restrictive than the MCL). Only UEs configured with DRX cycles that are shorter than the broadcasted length threshold value, and/or which measured coupling-loss or path-loss is better (i.e., numerically less) than the coupling threshold value monitor the DRX transmission opportunity (e.g., the paging occasion) based on the power saving signal, e.g., based on the presence of the WUS.

For the explicit configuration of WUS (as a non-limiting example of the power saving signal), the procedure (briefly: WUS procedure) may comprise the following steps:

In a negotiating step, the radio device (e.g., UE) and the CN (e.g., the MME) negotiate (e.g., according to a radio communication protocol) whether or not the WUS is to be used for the particular radio device (e.g., the UE). Optionally, parameters of the associated WUS configuration are also negotiated. The negotiation step may be a substep of, or may be triggered upon Attach and/or TAU.

In a storing step, a result of the negotiation (e.g., the signal configuration or a part thereof) is stored in the radio device (e.g., the UE) and in the CN (e.g., in the UE context in the MME).

The decision whether or not the WUS is to be used may be based on at least one of the following decision criteria. A first criterion relates to the UE capability for WUS, e.g., whether or not the UE is capable of detecting the WUS and controlling its receiver accordingly. A second criterion relates to at least one of a traffic profile of the UE, a service category of the UE, a subscription type of the UE and information (e.g., percentage value) as to whether the majority of POs are used (for paging message etc.) by the UE. A third criterion relates to the coverage enhancement level (CE-level) of the UE and/or a RSRP measured at the UE. A logic for not using the WUS based on the third criterion may be based on the reasoning that the WUS may be not beneficial in very good coverage, if the WUS must account for the highest CE level in the cell. A fourth criterion may relate to a battery requirement of the UE. A fifth criterion may relate to the coverage of the UE. For example, the WUS may be used if the RSRP exceeds a RSRP threshold, if the coupling loss of the UE is in a certain range, or if a length of the WUS (e.g., in the time domain) exceeds an NPDCCH transmission time. A logic for not using the WUS based on the fifth criterion may be based on the reasoning that it may be not beneficial for the WUS to cover the highest CE-level also for UEs in good coverage. A sixth criterion may relate to whether or not the UE is configured with PSM. A seventh criterion may relate to whether the UE is configured with eDRX. The listed criteria are not exhaustive. The decision may be based on other parameters and/or criteria.

In a broadcasting step of the WUS procedure, the eNB broadcasts in SI whether the WUS is to be used (e.g., whether the WUS is currently used) in the cell and/or the WUS configuration (e.g., the common or cell-specific part thereof).

In a monitoring step, which may be implemented as a substep of step 402 and/or 404, the UE monitors paging with WUS if configured for the UE and supported in the current cell. The UE applies a UE-specific signal configuration for the monitoring. Preferably, the UE monitors the WUS according to the highest CE-level configured in the cell to avoid eNB-UE mismatch.

At some point in time, e.g., in the step 614, DL data for the UE arrives, e.g., at a Serving GW of the CN. The data available at the CN may trigger or determine at least one of the steps 302 and 404. The MME 610 finds (e.g., queries) the UE-context of the UE and constructs the paging request 612, which is sent to the eNB. Constructing the paging request 612 includes appending UE-specific WUS information (e.g., the UE-specific part of the signal configuration) to the paging request 612, preferably at least if WUS is currently configured for the UE.

In a composing step of the WUS procedure, the eNB receives the paging request 612 in the step 302 from the MME 610. Based on the following composition inputs, the eNB composes the WUS 504. A first input is based on information in the paging request 612 from MME 610. The first input may be indicative of at least one of UE-support for the WUS (e.g., assuming the values "on" or "off"), a UE-specific WUS configuration, a status of a PSM for the UE, a status of an eDRX for the UE and a last known CE-level of the UE. A second input relates to the eNB-support for WUS. A third input relates to a maximum coverage supported in the cell (e.g., in terms of MCL and/or related to Rmax). A fourth input relates to the coverage of the UE. Based on the fourth input, the eNB may decide whether the WUS is activated (i.e., used), e.g., if the RSRP exceeds an RSPR threshold value, if the coupling loss of the UE is in a certain range, or if the length of the WUS exceeds the NPDCCH transmission time. The fourth input may be a necessary criterion checked by the eNB. Hence, the eNB may determine that the WUS configuration is deactivated, e.g., since the WUS must cover the highest CE-level which is not beneficial for UEs in good coverage. A fifth input may relate to if the UE is stationary or located in the same cell as last reported in a periodic TAU. The listed composition inputs are not exhaustive. The eNB may compose the WUS 504 based on the other or further input, e.g., other parameters and based on further criteria.

In the step 404, as a step of the WUS procedure, the UE detects the WUS, and the UE continues, according to the step 406 as a step of the WUS procedure, to receive (e.g., to read) on a control channel (e.g., PDDCH, NPDDCH or MPDCCH) and the associated data channel (e.g., a paging message on PDSCH or NPDSCH).

Herein, the eNB is a non-limiting example for the device 100, e.g., the node. Furthermore, the UE is a non-limiting example for the device 200, e.g., the radio device. Moreover, while the WUS procedure has been described for paging, it is not limited thereto but applicable also for DRX in RRC_CONNECTED mode. The skilled person can apply any of step of the WUS procedure to a radio device performing DRX in idle mode or connected mode. More specifically, a connected mode implementation of the WUS procedure may use dedicated RRC signaling for transmitting the UE-specific WUS configuration from the node and receiving the UE-specific WUS configuration at the radio device.

Figure 7:
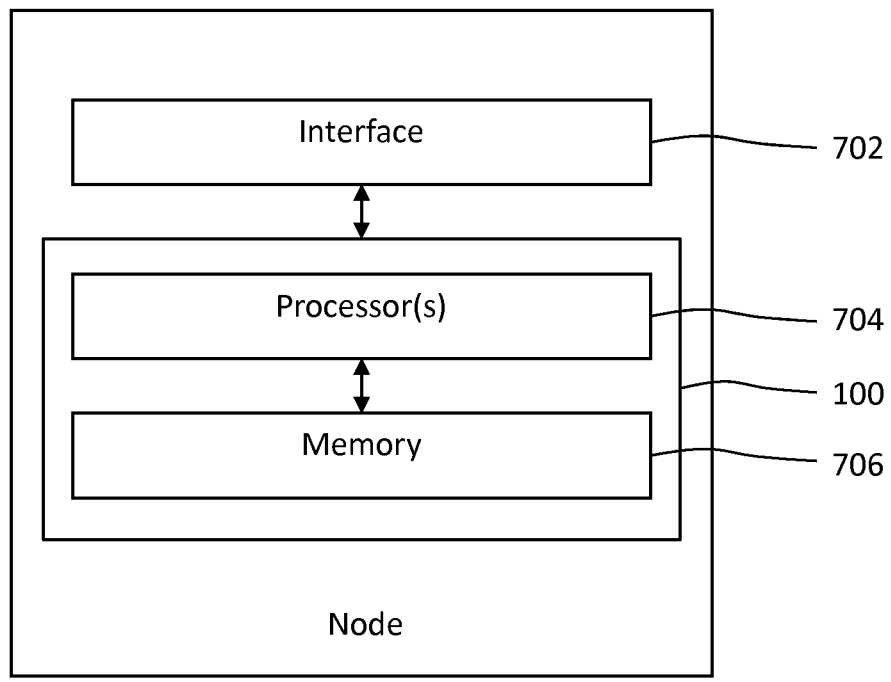
FIG. 7 shows a schematic block diagram of an embodiment of the device of FIG. 1.

FIG. 7 shows a schematic block diagram for an embodiment of the device 100. The device 100 comprises one or more processors 704 for performing the method 300 and memory 706 coupled to the processors 704. For example, the memory 706 may be encoded with instructions that implement at least one of the modules 102, 104 and 106.

The one or more processors 704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100 (such as the memory 706), scheduler functionality, data transmitter functionality or RAN functionality. For example, the one or more processors 704 may execute instructions stored in the memory 706. Such functionality may include providing various features and steps discussed herein, including any of the benefits disclosed herein. The expression "the device being operative to perform an action" may denote the device 100 being configured to perform the action.

As schematically illustrated in FIG. 7, the device 100 may be embodied by a node 700, e.g., of the RAN. The node 700 comprises a radio interface 702 coupled to the device 100 for radio communication with one or more radio devices.

In a variant, the functionality of the device 100 is, e.g., partly or completely, provided by another node of the RAN or another node of a core network linked to the RAN. That is, the other node performs the method 300. The functionality of the device 100 is provided by the other node to the node 700, e.g., via the interface 702 or a dedicated wired or wireless interface.

Figure 8:
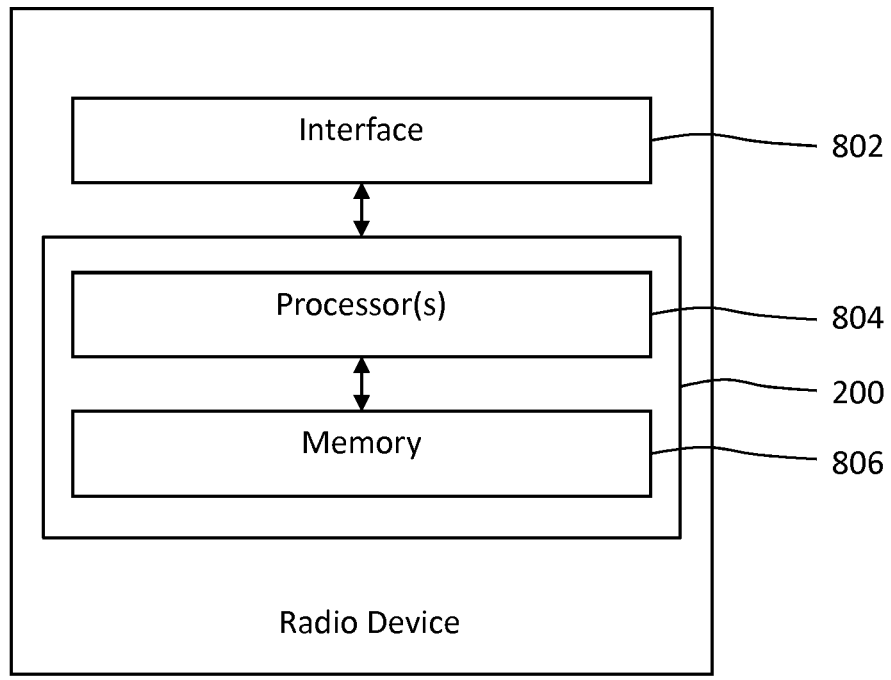
FIG. 8 shows a schematic block diagram of an embodiment of the device of FIG. 2.

FIG. 8 shows a schematic block diagram for an embodiment of the device 200. The device 200 comprises one or more processors 804 for performing the method 400 and memory 806 coupled to the processors 804. For example, the memory 806 may be encoded with instructions that implement at least one of the modules 202, 204 and 206.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100 (such as the memory 806), data receiver functionality or radio device functionality. For example, the one or more processors 804 may execute instructions stored in the memory 806. Such functionality may include providing various features and steps discussed herein, including any of the benefits disclosed herein. The expression "the device being operative to perform an action" may denote the device 200 being configured to perform the action.

As has become apparent from above description, embodiments of the technique enable a network control of when a power saving signal such as a Wake-up Signal (WUS) is actually used and/or an efficient transmission of the power saving signal. In same or further embodiments, a DRX configuration can ensure that the power saving signal always gives power consumption gains for the radio device (e.g., an UE) and not, as would be the case for some use cases, instead have a negative impact. The DRX configuration may be UE-specific.

Moreover, the technique may be implemented to reduce or limit a network overhead, e.g., by allowing for a WUS configuration such that a sufficiently but not excessively large WUS is transmitted.

A negative impact on UEs in good coverage from using WUS may be avoided, e.g., by implementing the fourth embodiment. For example, the WUS must account for the worst coverage in the cell, which may result in a long reception time, e.g. 16 ms or longer, but NPDCCH/MPDCCH only requires 1 repetition for successful detection and therefore 1 ms of reception in good coverage is used (e.g., up to 142-145 dB coupling loss according to a link simulation which is the case for a large part of the UEs). By using the coverage of the UE in the decision whether or not the WUS is used, configuring UEs in good coverage for the WUS can be avoided. For example, the eNB may broadcast a RSRP threshold value in system information, and those UEs which measure a RSRP lower than this RSRP threshold value implicitly assume that WUS is used for paging.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention encompasses the scope of the following embodiments.

The invention claimed is:

1. A method of transmitting data from a node of a radio access network (RAN) to a radio device that is configured for discontinuous reception (DRX) according to a DRX configuration, the method comprising:
   indicating, via broadcasting system information, whether a wake-up signal (WUS) is to be transmitted in a selective transmission to the radio device;
   determining whether data is available for transmission to the radio device;
   selectively transmitting the WUS to the radio device depending on the DRX configuration and the indication via the system, wherein a length of the WUS depends on the maximum coupling loss (MCL) supported by the node; and
   transmitting, in response to the data being available and to the radio device on a radio resource according to the DRX configuration, data and/or a scheduling assignment for the transmission of the data.

2. The method of claim 1:
   wherein the radio resource according to the DRX configuration comprises an active interval of the radio device according to the DRX configuration; and
   wherein the WUS is transmitted at or before the beginning of the active interval according to the DRX configuration.

3. The method of claim 1, wherein the DRX configuration of the radio device defines DRX cycles, each of the DRX cycles comprising the radio resource according to the DRX configuration for transmitting to the radio device.

4. The method of claim 3, wherein the selective transmission of the WUS depends on a usage of the radio resources for transmitting to the radio device in previous of the DRX cycles.

5. The method of claim 4, wherein the selective transmission of the WUS depends on a length of the DRX cycles configured for the radio device according to the DRX configuration.

6. The method of claim 5, wherein the WUS is selectively transmitted to the radio device if the length of the DRX cycle for the radio device is equal to or less than a length threshold value.

7. The method of claim 6, further comprising broadcasting the length threshold value in system information.

8. The method of claim 1, wherein the WUS is selectively transmitted to the radio device when a quality of service (QoS) requirement or a QoS class identifier (QCI) for the radio device is equal to or greater than a quality threshold value.

9. The method of claim 1, wherein the WUS is selectively transmitted to the radio device depending on:
   a history of data transmission to the radio device;
   a reference signal received power (RSRP) reported by the radio device to the node;
   a reference signal received quality (RSRQ) reported by the radio device to the node;
   a maximum coupling loss (MCL) supported by the node;
   a length of the WUS; and/or
   a length of downlink control information (DCI) including the scheduling assignment.

10. A method of receiving data from a node of a radio access network (RAN) at a radio device that is configured for discontinuous reception (DRX) according to a DRX configuration, the method comprising:
    receiving an indication, via broadcasted system information, whether a wake-up signal (WUS) will be transmitted in a selective transmission to the radio device;
    selectively enabling, depending on the DRX configuration and the indication via the system information, a receiver for receiving the WUS from the node, wherein a length of the WUS depends on the maximum coupling loss (MCL) supported by the node;
    determining, based on the receiver enabled for receiving the WUS, whether data is available for reception from the node; and
    receiving, in response to the data being available and from the node on a radio resource according to the DRX configuration, the data and/or a scheduling assignment for the transmission of the data.

11. The method of claim 10:
    wherein the radio resource according to the DRX configuration comprises an active interval of the radio device according to the DRX configuration; and
    wherein the WUS is received at or before the beginning of the active interval according to the DRX configuration.

12. The method of claim 10, wherein the DRX configuration of the radio device defines DRX cycles, each of the DRX cycles comprising the radio resource according to the DRX configuration for transmitting to the radio device.

13. The method of claim 12, wherein the selective enabling the receiver for receiving the WUS from the node depends on a usage of the radio resources for transmitting to the radio device in previous of the DRX cycles.

14. The method of claim 13, wherein the selective enabling the receiver for receiving the WUS from the node depends on a length of the DRX cycles configured for the radio device according to the DRX configuration.

15. A device for transmitting data from a node of a radio access network (RAN) to a radio device that is configured for discontinuous reception (DRX) according to a DRX configuration, the device comprising:
processing circuitry;
memory containing instructions executable by the processing circuitry whereby the device is operative to:
indicate, via broadcasting system information, whether a wake-up signal (WUS) is to be transmitted in a selective transmission to the radio device;
determine whether data is available for transmission to the radio device;
selectively transmit the WUS to the radio device depending on the DRX configuration and the indication via the system information, wherein a length of the WUS depends on the maximum coupling loss (MCL) supported by the node; and
transmit, in response to the data being available and to the radio device on a radio resource according to the DRX configuration, the data and/or a scheduling assignment for the transmission of the data.

16. The device of claim 15:
wherein the radio resource according to the DRX configuration comprises an active interval of the radio device according to the DRX configuration; and
wherein the instructions are such that the device is operative to transmit the WUS at or before the beginning of the active interval according to the DRX configuration.

17. The device of claim 15, wherein the DRX configuration of the radio device defines DRX cycles, each of the DRX cycles comprising the radio resource according to the DRX configuration for transmitting to the radio device.

18. The device of claim 17, wherein the instructions are such that the device is operative to selectively transmit the WUS depending on a usage of the radio resources for transmitting to the radio device in previous of the DRX cycles.

19. A device for receiving data from a node of a radio access network (RAN) at a radio device that is configured for discontinuous reception (DRX) according to a DRX configuration, the device comprising:
processing circuitry;
memory containing instructions executable by the processing circuitry whereby the device is operative to:
receive an indication via broadcasted system information, whether a wake-up signal (WUS) will be transmitted in a selective transmission to the radio device;
selectively enable, depending on the DRX configuration and the indication via the system information, a receiver for receiving the WUS from the node, wherein a length of the WUS depends on the maximum coupling loss (MCL) supported by the node;
determine, based on the receiver enabled for receiving the WUS, whether data is available for reception from the node; and
receive, in response to the data being available and from the node on a radio resource according to the DRX configuration, the data and/or a scheduling assignment for the transmission of the data.

* * * * *

UNITED STATES PATENT AND TRADEMARK OFFICE
CERTIFICATE OF CORRECTION

PATENT NO. : 11,240,756 B2
APPLICATION NO. : 16/642940
DATED : February 1, 2022
INVENTOR(S) : Höglund et al.

It is certified that error appears in the above-identified patent and that said Letters Patent is hereby corrected as shown below:

On the Title Page

On Page 2, item [56], Column 1, Line 4, delete ""PowerSaving" and insert -- "Power Saving --, therefor.

In the Specification

Column 1, Line 15, delete "3rd Generation Partnership (3GPP)" and insert -- 3rd Generation Partnership Project (3GPP) --, therefor.

Column 1, Lines 42-43, delete "random access" and insert -- random-access --, therefor.

Column 1, Line 60, delete "paging occasions (PO)" and insert -- paging occasions (POs) --, therefor.

Column 3, Lines 35-36, delete "Global System for Mobile Communications (GSM)," and insert -- Global System for Mobile Communication (GSM), --, therefor.

Column 7, Line 24, delete "compatibility" and insert -- compatible --, therefor.

Column 7, Line 29, delete "not be" and insert -- not --, therefor.

Column 8, Line 10, delete "method 200," and insert -- method 300, --, therefor.

Column 13, Line 39, delete "as to the" and insert -- the --, therefor.

Column 14, Line 67, delete "and thus deceasing" and insert -- thus decreasing --, therefor.

Column 15, Line 1, delete "increase" and insert -- an increase --, therefor.

Column 17, Line 50, delete "any" and insert -- an --, therefor.

Signed and Sealed this
Seventeenth Day of May, 2022

Katherine Kelly Vidal
*Director of the United States Patent and Trademark Office*

CERTIFICATE OF CORRECTION (continued)
U.S. Pat. No. 11,240,756 B2

Column 17, Line 55, delete "any" and insert -- an --, therefor.

Column 18, Line 35, delete "the" and insert -- to the --, therefor.

Column 19, Line 56, delete "on such" and insert -- on --, therefor.

Column 19, Line 63, delete "same of" and insert -- same or --, therefor.

Column 20, Line 40, delete "(N)PDSCH" and insert -- NPDSCH --, therefor.

Column 20, Line 49, delete "WUS)," and insert -- WUS). --, therefor.

Column 21, Line 31, delete "repetition)," and insert -- repetitions), --, therefor.

Column 21, Line 45, delete "signaling" and insert -- signal --, therefor.

Column 21, Line 55, delete "push" and insert -- pushed --, therefor.

Column 21, Line 59, delete "of" and insert -- to --, therefor.

Column 24, Line 8, delete "PDDCH, NPDDCH" and insert -- PDCCH, NPDCCH --, therefor.

Column 24, Line 16, delete "any of" and insert -- any --, therefor.